US009369746B2

(12) United States Patent
Einarsson et al.

(10) Patent No.: US 9,369,746 B2
(45) Date of Patent: Jun. 14, 2016

(54) APPARATUS AND METHOD FOR TUNING TO A CHANNEL OF A MOVING PICTURES EXPERT GROUP TRANSPORT STREAM (MPEG-TS)

(75) Inventors: Torbjörn Einarsson, Stockholm (SE); Thorsten Lohmar, Aachen (DE); Thomas Rusert, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 730 days.

(21) Appl. No.: 13/386,694

(22) PCT Filed: Aug. 7, 2009

(86) PCT No.: PCT/EP2009/060309
§ 371 (c)(1),
(2), (4) Date: Mar. 21, 2012

(87) PCT Pub. No.: WO2011/015251
PCT Pub. Date: Feb. 10, 2011

(65) Prior Publication Data
US 2012/0246690 A1    Sep. 27, 2012

(51) Int. Cl.
*H04N 7/173*    (2011.01)
*H04N 21/242*    (2011.01)
*H04N 21/234*    (2011.01)
*H04N 21/438*    (2011.01)
*H04N 21/44*    (2011.01)
*H04N 21/643*    (2011.01)

(52) U.S. Cl.
CPC ....... *H04N 21/242* (2013.01); *H04N 21/23406* (2013.01); *H04N 21/23424* (2013.01); *H04N21/4384* (2013.01); *H04N 21/44004* (2013.01); *H04N 21/44016* (2013.01); *H04N 21/64322* (2013.01)

(58) Field of Classification Search
CPC ................ H04N 21/23106; H04N 21/234381; H04N 21/23439; H04N 21/23608
USPC ................................ 725/78, 82, 93, 109, 120
See application file for complete search history.

(56) References Cited

U.S. PATENT DOCUMENTS

| 2003/0200548 A1 | 10/2003 | Baran et al. |
| 2007/0204320 A1 | 8/2007 | Wu et al. |
| 2007/0214490 A1 | 9/2007 | Cheng et al. |

FOREIGN PATENT DOCUMENTS

| EP | 1223689 A1 | 7/2002 |
| EP | 1581005 A1 | 9/2005 |
| JP | H11261573 A | 9/1999 |
| JP | 2008245050 A | 10/2008 |
| JP | 2009038448 A | 2/2009 |
| JP | 2009147855 A | 7/2009 |

OTHER PUBLICATIONS

Siebert, P. et al. "Analysis and Improvements of Zapping Times in IPTV Systems." IEEE Transactions on Broadcasting, IEEE Service Center, Jun. 1, 2009, pp. 407-418, vol. 55, No. 2, Piscataway, New Jersey, USA.

*Primary Examiner* — Dominic D Saltarelli
(74) *Attorney, Agent, or Firm* — Coats & Bennett, PLLC

(57) ABSTRACT

A method and apparatus for tuning to a channel of a Moving Pictures Expert Group transport stream (MPEG-TS), for example used in an Internet Protocol Television (IPTV) network, are provided for optimizing a channel change procedure. The method comprises the steps of receiving a MPEG transport stream at a first bit rate, the MPEG transport stream comprising a plurality of television channels. Program clock reference (PCR) values are identified in the received MPEG transport stream, and one or more of the program clock reference (PCR) values are adjusted. The MPEG transport stream, including the adjusted program clock reference values, are transmitted at a second bit rate, for example to a receiver device such as a set top box, thereby enabling the set top box to perform a channel change procedure more quickly.

19 Claims, 5 Drawing Sheets

APPARATUS AND METHOD FOR TUNING TO A CHANNEL OF A MOVING PICTURES EXPERT GROUP TRANSPORT STREAM (MPEG-TS)

TECHNICAL FIELD

The present invention relates to a method for tuning to a channel of a Moving Pictures Expert Group transport stream (MPEG-TS), for example when performing a Fast Channel Change (FCC) procedure in an Internet Protocol Television (IPTV) network.

BACKGROUND

Subscriber quality of experience is an important aspect for both Internet Protocol Television (IPTV) and mobile television (Mobile TV). While there are many factors affecting IPTV service quality, such as picture quality or reliability, a key quality of experience element is how quickly and reliably subscribers can change TV channels.

Conventionally, with IPTV, a subscriber wishing to view a video channel must join a video stream at an appropriate access point within the video stream. This can cause delays during a channel changing procedure in IPTV (i.e. during so-called "channel zapping"), which can result in the subscriber experiencing a slow response time during channel changes.

To improve channel changing response times various techniques, for example Fast Channel Change (FCC) and Fast Content Switching (FCS) have been developed for IPTV and Mobile TV, respectively.

FIG. 1 shows the steps performed during a typical channel change procedure in IPTV, and depict an example scenario with average (worst case) timings based on a 1 second video buffer time and 0.5 second Group of Pictures (GOP) time (GOP being the sequences of I, B and P frames in an IPTV network).

First, a receiver such as a Set Top Box (STB) or television wishing to receive a new channel must first be tuned to the new channel. This involves sending a command to the network and processing the command until tuning has been completed (these steps being shown at times $t_1$, $t_2$ and $t_3$). The first video packets will only be received by the set top box at time $t_3$. i.e. after tuning is complete. In the case of IPTV, the control mechanism typically used to control delivery of multicast traffic to subscribers is the Internet Group Multicast Protocol (IGMP). IGMP commands are used to instruct the upstream equipment to stop sending ("leave") one channel or to begin sending ("join") another channel. Therefore, at time $t_1$ the set top box sends an IGMP join command to the network, which results in the network starting to forward the packets for the requested channel to the set top box.

Alternatively, a Real Time Streaming Protocol (RTSP) command can be used instead of an IGMP command to fetch the data, the RTSP command typically being used only to "join" and "leave" certain IPTV channels. RTSP is a control protocol typically used for control of media streaming servers. RTSP is used to typically control unicast delivery (but can also be used for Multicast), whereas IGMP is used to control subscription to multicast groups in the case of multicast delivery.

In the case of traditional broadcast, for example Digital Video Broadcast-Satellite (DVB-S), the receiver (e.g. set top box or television) must tune to the new transponder frequency of the channel or channel bundle. MPEG Transport Stream (MPEG-TS) is typically used in such broadcast systems, where multiple channels are multiplexed into a single transport stream. The transport stream containing the multiple channels is then transmitted on a single frequency (e.g. satellite transponder). The set top box parses the received MPEG transport stream, looking for Program Specific Information (PSI), mainly a Program Association Table (PAT) and a Program Map Table (PMT). These two tables describe the allocation of the channel within the transport stream, i.e. the packet identifiers (PIDs) belonging to the channel, multimedia codecs (MPEG2, MPEG4, . . . etc.) and also which PIDs carry the Program Clock References (PCRs) for the channel. This example assumes a "free-to-air" transmission. In the case of content protected IPTV channels, the set top box also looks for the conditional access table (CAT), which describe the content protection scheme that is used. In such a system the set top box must also decrypt the MPEG transport stream to render the content.

The Program Clock References (PCRs) are provided to assist the set top box in presenting programs on time, at the right speed, and in a synchronized manner. For example, in Europe video frames are intended to be displayed at 25 frames/sec, and each picture in the video stream will carry a time stamp indicating when the picture frame is to be displayed in real time (for example a first frame at 2 pm and a subsequent frame ¹⁄₂₅th second later, etc.). The PCRs synchronize the clock of the receiver with the clock of the sender, and thus are used to control buffering of the transport stream at a receiver.

It will be appreciated that undesirable delays are experienced during the processing of a received transport stream as described above.

For example, while the set top box is acquiring the PIDs there is a delay "X" between time $t_3$ to $t_4$ of typically 100 to 200 msec.

Once the set top box has acquired the PAT and PMT, the set top box then starts parsing for a proper "random access point" (RAP) into the new channel. In the case of MPEG2 Video, this is an Intra Frame procedure. FIG. 1 assumes that a random access point is provided every 0.5 seconds. Again, it will be appreciated that an undesired delay is experienced during the search for the video start, shown in FIG. 1 as a delay "Y" between times $t_4$ and $t_5$.

After the set top box has identified a random access point to the TV channel, i.e. found the video start at time $t_5$, the set top box then starts buffering the received packets. The buffer is intended to take care of the varying media bit rate compared to the (relatively) constant transport rate.

The decoding time for the Intra Frame is provided within the transport stream, and in particular the Decoding Time Stamp (DTS) extension header of the Packetized Elementary System (PES) header. The set top box requires the PCR information to synchronize its system clock with the sender side for decoding. Thus, the MPEG-TS receiver determines the buffering time at the set top box (i.e. the time from when the video start is found at time $t_5$ to the time when the decoding starts) using the PCR. The buffering time, $B_t$ is given as:

Buffer time $B_1 = DTS(i) - PCR(i)$ where "i" is the first MPEG-TS packet of the video Intra Frame, DTS(i) is the decoding time stamp of the frame, which starts at the ith MPEG-TS packet, and PCR (i) is the receiver system time at the ith MPEG-TS packet. The ith MPEG-TS packet includes the start of a frame.

All PES data for this frame must be transmitted during this buffer time $B_t$ (i.e. $(DTS(i)-PCR(i))/300)/90000$, since the system clock frequency is 27 MHz (also precision of PCR) and DTS clock frequency is 90 kHz; since PCR(i) represents the system clock in units of 1/27000000 seconds (27 MHz), PCR(i)/300 represents the system clock in units of 1/90000 seconds (90 kHz); since (DTS(i)−PCR(i)/300) represents the buffer time in units of 1/90000 seconds (90 kHz), (DTS(i)−PCR(i)/300)/90000 represents the buffer time in units of seconds). The PES packets for the frame must be transmitted with a bit rate of at least:

(len(PES−Data)*90000/(DTS($i$)−PCR($i$)/300))

Typically, the bit rate is related to the PCRs in the stream as:

(PCR($i+N$)−PCR($i$))/(27000000*$N$), where N is equal to the number of packets in the transport stream, and wherein the bit rate of the transport stream is constant between PCT boundaries.

In addition to this decoding time, the set top box requires further time to rearrange the frames from "transmission order" into "display order" (PTS-DTS).

It will therefore be appreciated that an undesirable delay is experienced during this decoding procedure, shown as a delay "Z" between times $t_5$ and $t_6$ in FIG. 1, which can be typically 700 to 1000 msec.

The tuning or channel change procedure described above therefore has a number of undesirable delays. These delays are caused by different steps in the tuning or channel change procedure, including delays during a buffering procedure.

SUMMARY

It is an aim of the present invention to reduce one or more of the delays mentioned above. In particular, it is an aim of the present invention to provide an apparatus and method for optimizing tuning to a channel of a Moving Pictures Expert Group transport stream (MPEG-TS), for example a channel change procedure in an Internet Protocol (IP) network configured to transport MPEG packets, for example when using MPEG Transport Streams (MPEG-TS) over an Internet Protocol Television (IPTV) network.

According to a first aspect of the invention there is provided a method for tuning to a channel of a Moving Pictures Expert Group transport stream (MPEG-TS). The method comprises the step of receiving a MPEG transport stream at a first bit rate, the MPEG transport stream comprising a plurality of channels. Program clock reference (PCR) values are identified in the received MPEG transport stream, and one or more of the program clock reference (PCR) values adjusted. The method also comprises the step of transmitting the MPEG transport stream, including the adjusted program clock reference values, at a second bit rate.

The invention has the advantage being able to send data, such as MPEG-TS data, at a faster rate to an end receiver, thereby enabling the tune-in time into the data stream to be reduced during a channel change procedure.

In such an embodiment of the invention the adjusting step comprises the step of adjusting the one or more program clock reference values in relation to the difference between the second bit rate and the first bit rate. The difference between a first program clock reference value and a second program clock reference value may be adjusted. In addition, the difference between the second program clock reference value and a third program clock reference value may be adjusted.

According to one embodiment of the invention a predetermined program clock reference value may be selected in the received MPEG transport stream, with all program clock reference values that occur prior to said predetermined program clock reference value in the MPEG transport stream being adjusted, and all subsequent program clock reference values being left unmodified.

The received MPEG transport stream may be buffered so that the transmitted MPEG transport stream can be transmitted at a higher bit rate that the received MPEG transport stream. According to one embodiment of the invention this comprises the step of buffering the received MPEG transport stream up until the predetermined program clock reference value. The MPEG transport stream may be transmitted at the second bit rate for a predetermined period of time, for example a time period required to buffer data for a tuning or channel change procedure.

According to an embodiment of the invention, the method may further comprise the step of aligning program specific information with intra frames in the received MPEG transport stream, and transmitting the aligned MPEG transport stream.

According to one embodiment the step of transmitting the MPEG transport stream may comprise the step of transmitting program specific information (PSI) prior to transmitting intra frame packets.

The program clock references (PCRs) may be provided in intra frame packets of the MPEG transport stream. Alternatively, the program clock references (PCRs) may be provided in a dedicated channel in the MPEG transport stream.

It is noted that the step of tuning to a channel of a MPEG transport stream may comprise the step of tuning from an existing channel to a new channel, or the step of tuning to an initial channel.

According to another aspect of the invention there is also provided a node for tuning to a channel of a Moving Pictures Expert Group transport stream (MPEG-TS). The node comprises a receiver unit for receiving a MPEG transport stream at a first bit rate, the MPEG transport stream comprising a plurality of channels. The node also comprises a processing unit adapted to identify program clock reference (PCR) values in the received MPEG transport stream, and to adjust one or more of the program clock reference (PCR) values. The node further comprises a transmitter unit adapted to transmit the MPEG transport stream, including the adjusted program clock reference values, at a second bit rate.

The processing unit may be adapted to adjusting the one or more program clock reference values in relation to the difference between the second bit rate and the first bit rate. According to one embodiment of the invention, the processing unit is adapted to adjust a difference between a first program clock reference value and a second program clock reference value. The adjusting means may also be adapted to adjust a difference between the second program clock reference value and a third program clock reference value. According to one embodiment the processing unit is adapted to select a predetermined program clock reference value in the received data stream, and adjust all program clock reference values that occur prior to said predetermined program clock reference value in the data stream, and leave all subsequent program clock reference values unmodified.

The node may also comprise a buffer for storing the received MPEG transport stream. The transmitter unit may be adapted to transmit the MPEG transport stream at the second bit rate for a predetermined period of time. For example, this may correspond to the time taken to buffer data during a tuning or channel change procedure.

The node may also comprise a cache for storing program specific information (PSI). The transmitter unit may be adapted to transmit the program specific information (PSI) from the cache prior to transmitting intra frame packets of the MPEG transport stream.

According to a further aspect of the invention, the rendering of Intra Frames may be synchronized with the system clock, which is synchronized with a sender clock using Program Clock References (PCRs). This has the advantage of reducing the time "Y" shown in FIG. 1.

According to yet a further aspect of the present invention, the PSI information may be sent with the very first packets after a tune-in procedure, which has the advantage of reducing the time "X" shown in FIG. 1.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

The embodiments will be described below in relation to Internet Protocol Television (IPTV), and in the context of TV channels being broadcast using the MPEG format MPEG2. It is noted, however, that the invention is not limited to these particular contexts, and is intended to cover any form of digital TV, including for example Mobile IPTV (or Mobile TV), and any form of protocol for delivering the data, i.e. other than just MPEG2.

It is also noted that any references made to "tuning" or "changing" channels is intended to include tuning or changing from one channel to another channel, or tuning in to an initial channel, i.e. a first channel.

Figure 1:
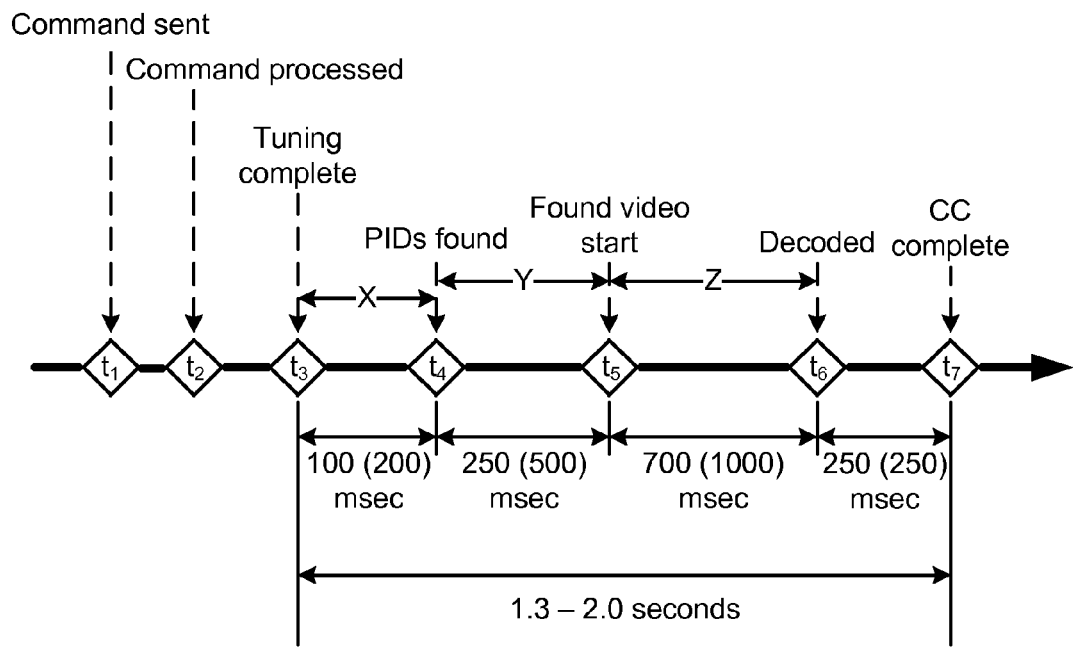
FIG. 1 shows a typical channel change procedure.

According to a first aspect of the invention, there is provided an apparatus and method for minimizing the initial buffering time during a channel change procedure, i.e. corresponding to the buffering time shown as time "Z" in FIG. 1, so that a set top box can start presentation earlier than intended by the sender.

According to a first embodiment of the present invention, this is accomplished by providing the video data faster (i.e. at a higher bit rate) to the set top box than initially intended. However, if the video data in the MPEG transport stream is just sent faster than initially indented, this does not give any benefit since, as described above, it is the sender that determines the buffering time $B_t$ at the receiver. This is because the buffering time $B_t$ is determined by the difference between the Decoding Time Stamp (DTS) and the Program Clock Reference (PCR), and the bit rates through the PCR values in the data stream. Therefore, just sending the MPEG transport stream at a higher bit rate will result in the buffer of the set top box overflowing, which has the effect of degrading the channel changing experience.

Therefore, according to an embodiment of the invention the PCRs are identified in the MPEG-TS stream and modified in relation to the amount by which the bit rate of the MPEG-TS is being increased. In other words, the PCRs are increased, for example, in relation to how much the bit rate is increased.

In the following description various examples are described for ensuring that the step of increasing the MPEG-TS bit rate has the desired effect of decreasing the buffering time. It is noted that these are examples only, and that the invention is intended to cover other methods falling within the scope of the appended claims.

Figure 2:
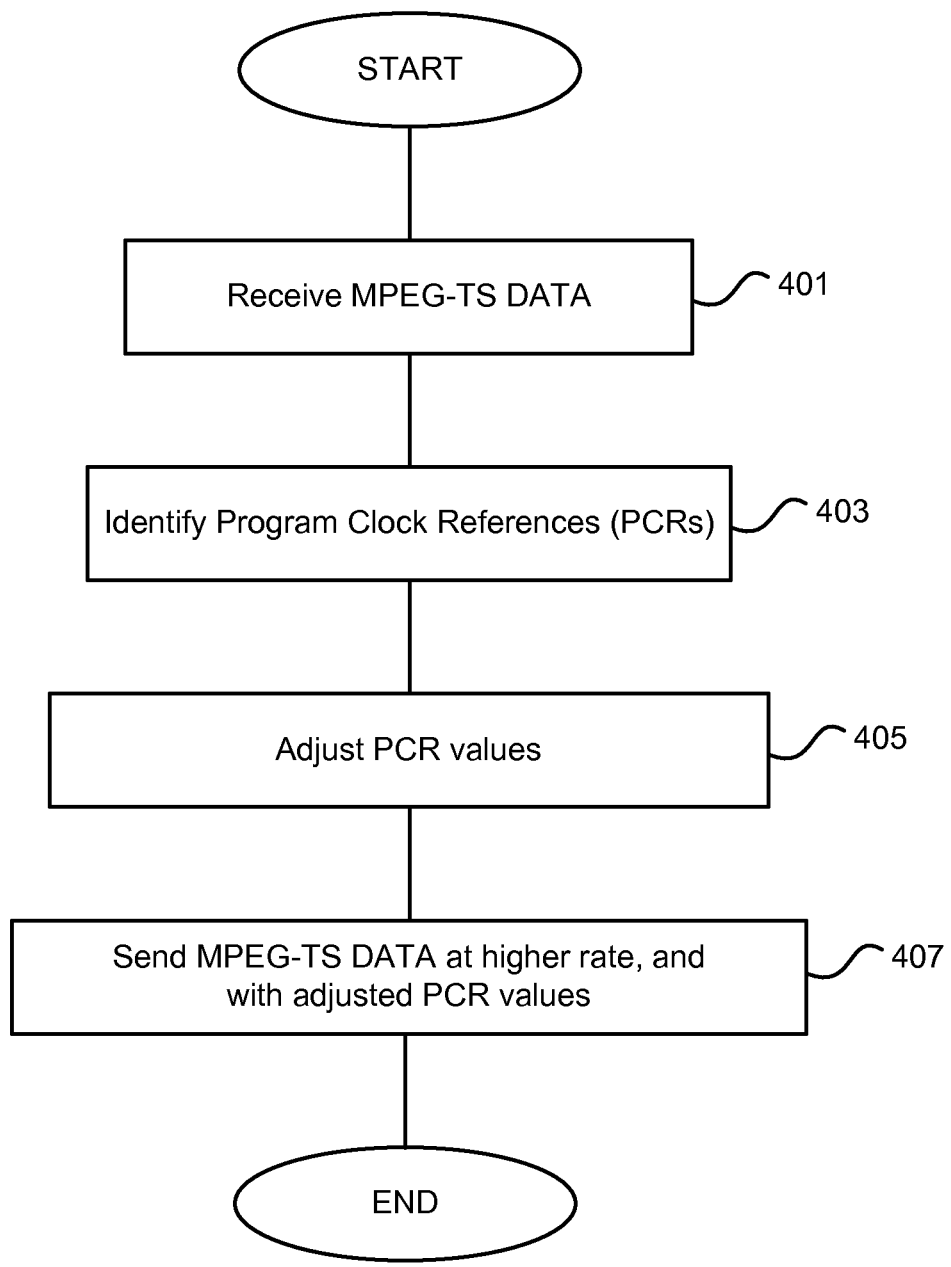
FIG. 2 shows the steps performed by a first embodiment of the present invention.

FIG. 2 shows the steps performed by an embodiment of the invention, for example a node of an IPTV network providing a fast channel change function (referred to hereinafter as a "channel change unit"). In step 401 a MPEG transport stream is received. The MPEG transport stream will have a first bit rate, which will be determined by the sender of the MPEG transport stream, for example a MPEG-TS multiplexer provided in the IPTV network. In step 403 the Program Clock References are identified within the received MPEG-TS. One or more of the Program Clock References are then adjusted, step 405, for example by increasing the time stamps of the Program Clock References in accordance with the amount by which the bit rate of the MPEG transport stream is going to be increased during a channel change procedure, i.e. in order to reduce the buffering time at the end receiver (e.g. set top box) during such a channel change procedure. The MPEG-TS is then transmitted at the increased bit rate to the receiver, step 407, and includes the adjusted Program Clock Reference values.

It will be appreciated that, as described in greater detail below, the incoming transport stream will need to be buffered for a predetermined period of time in the channel change unit, the predetermined period of time being sufficient to allow the transmission data rate in step 407 to be increased temporarily during the channel change procedure.

By adjusting the Program Clock Reference values, i.e. the values used to synchronize the clock of the receiver with the clock of the sender, the MPEG transport stream can be transmitted from the channel change unit to the end receiver at a higher bit rate during a channel change procedure, but without causing a buffer in the end receiver to overflow.

Figure 3:
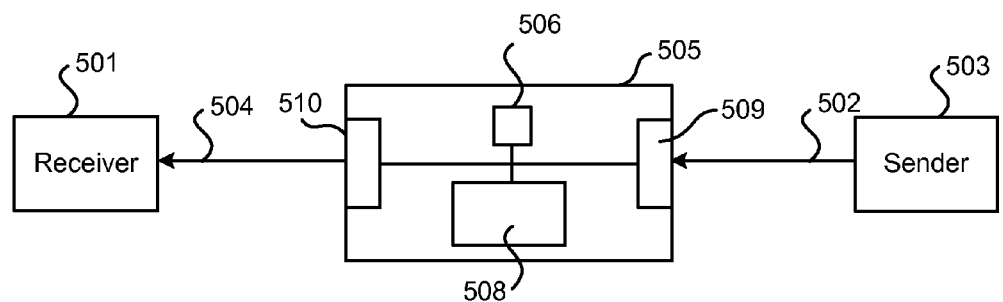
FIG. 3 shows a channel change unit according to another embodiment of the present invention.

FIG. 3 shows a channel change unit according to an embodiment of the invention. An "end receiver" or receiver unit 501, for example a set top box, receives video data from a sender unit 503, for example a MPEG-TS multiplexer provided in an IPTV network. According to this embodiment of the invention, a channel change unit 505 comprises a receiver unit 509 for receiving the MPEG-TS data from the sender unit 503. As mentioned above in relation to FIG. 2, the channel change unit 505 is configured to receive the MPEG-TS data from the sender unit 503 at a first bit rate, and to temporarily transmit the MPEG-TS data, using a transmitter unit 510, to the receiver unit 501 at a second bit rate, for example a higher bit rate during a channel change procedure. The channel change unit comprises a buffer 506 and a processing unit 508. The buffer unit 506 buffers the MPEG-TS data received from the sender unit 503 (via the receiver unit 509), so that the channel change unit 505 is able to temporarily transmit MPEG-TS data to the receiver unit 501 at a higher bit rate, i.e. during a channel change procedure. It will be appreciated that the size of the buffer 506 is chosen according to the bit rates concerned and the amount of time that the channel change unit 505 is expected to temporarily transmit at a higher bit rate. For instance, assuming that the incoming bit rate is 5 Mbit/s and the outgoing bit rate is 10 Mbit/s (i.e. the bit rate is increased by a factor of 2) for a duration of 500 ms, then the buffer 506 will be large enough to carry the data 504 that is sent to the receiver 501 during the channel change procedure minus the data 502 that is received by the channel change unit 505 during that time, i.e. 5 Mbit/s*500 ms=2.5 Mbit.

According to the invention the processing unit 508 of the channel change unit 505 is configured to identify Program Clock References within the MPEG-TS, and to increase the Program Clock Reference values in accordance with the difference between the second bit rate and the first bit rate, for example based on how much the bit rate is being increased.

The invention has the effect of reducing the buffer time "Z" shown in FIG. 1.

In the embodiment above the channel change unit 505 acts as a form of intermediate node. It will be appreciated however, that the function being performed by the channel change unit 505 could equally be provided as part of the sender unit 503 or the receiver unit 501, rather than being a separate node as shown in FIG. 3.

The Program Specific Information contained in the MPEG-TS data 502 received from the sender unit 503 may, or may not, be aligned with the video Intra Frames. If the MPEG-TS data 502 received from the sender unit 503 is aligned with the video Intra Frames, then the MPEG-TS data 504 is preferably transmitted at the second bit rate (i.e. higher bit rate) to the receiver unit 501 with the Program Specific Information still aligned. It is likely that the Program Specific Information is only aligned during the initial period of the MPEG-TS, for example the first few seconds. According to this embodiment, since the Program Specific Information is already received in a format such that it is aligned with the Intra Frames, the channel change unit 505 does not need to detect Intra Frames in the received transport stream. Instead, the channel change unit 505 may be configured to detect proper channel change or tune-in points in the received transport stream using the Program Association Table.

Figure 4:
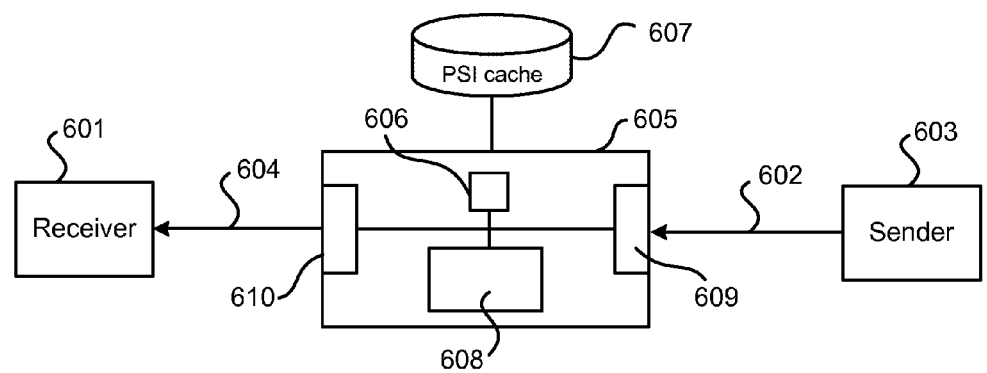
FIG. 4 shows a channel change unit according to another embodiment of the present invention.

FIG. 4 shows a further embodiment of the invention, showing how a channel change unit can be further adapted in the event that Program Specific Information in the MPEG-TS data received from a sender unit 503 is not aligned with the video Intra Frames.

As shown in FIG. 4, a receiver unit 601, for example a set top box, receives video data from a sender unit 603, for example a MPEG-TS multiplexer. A channel change unit 605 comprises a receiver unit 609 for receiving the MPEG-TS data from the sender unit 603 at a first bit rate, and a transmitter unit 610 for transmitting the MPEG-TS data to the receiver unit 601 at a second bit rate, for example a higher bit rate. The channel change unit 605 comprises a buffer 606 and a processing unit 608. The buffer 606 buffers the MPEG-TS data received from the sender unit 603 (via the receiver unit 609), so that the channel change unit 605 is able to temporarily transmit MPEG-TS data to the receiver unit 601 at a higher bit rate, i.e. during a channel change procedure. It will be appreciated that the size of the buffer 606 is chosen according to the bit rates concerned and the amount of time that the channel change unit 605 is expected to temporarily transmit at a higher bit rate.

As described in FIG. 3, the processing unit 608 of the channel change unit 605 is configured to identify program clock references within the MPEG-TS, and to increase one or more of the Program Clock Reference values in accordance with the difference between the second data rate and the first data rate, i.e. based on how much the bit rate is being increased. According to this embodiment of the invention the processing unit 608 of the channel change unit 605 is further configured to align the Program Specific Information with the video Intra Frames. A cache 607 is provided for storing Program Specific Information for this purpose. The cache 607 may reside within the channel change unit 605, or be located elsewhere in the network. In order to align PSI information with the Intra Frames, the channel change unit 605 parses the MPEG-TS to identify Intra Frames, e.g. by interpreting a "random_access_indicator" field in the "adaptation_field" of the transport stream, or by parsing the elementary streams and identifying Intra Frames according to the video codecs used (i.e. parsing headers of video packets). Once an MPEG-TS packet has been detected, the PSI information buffered in the cache 607 may be inserted into the MPEG-TS immediately before the packet carrying the Intra frame. It is noted that, since some PSI information may change over time, it is preferable that the PSI cache 607 should always keep the latest PSI tables.

Figure 5:
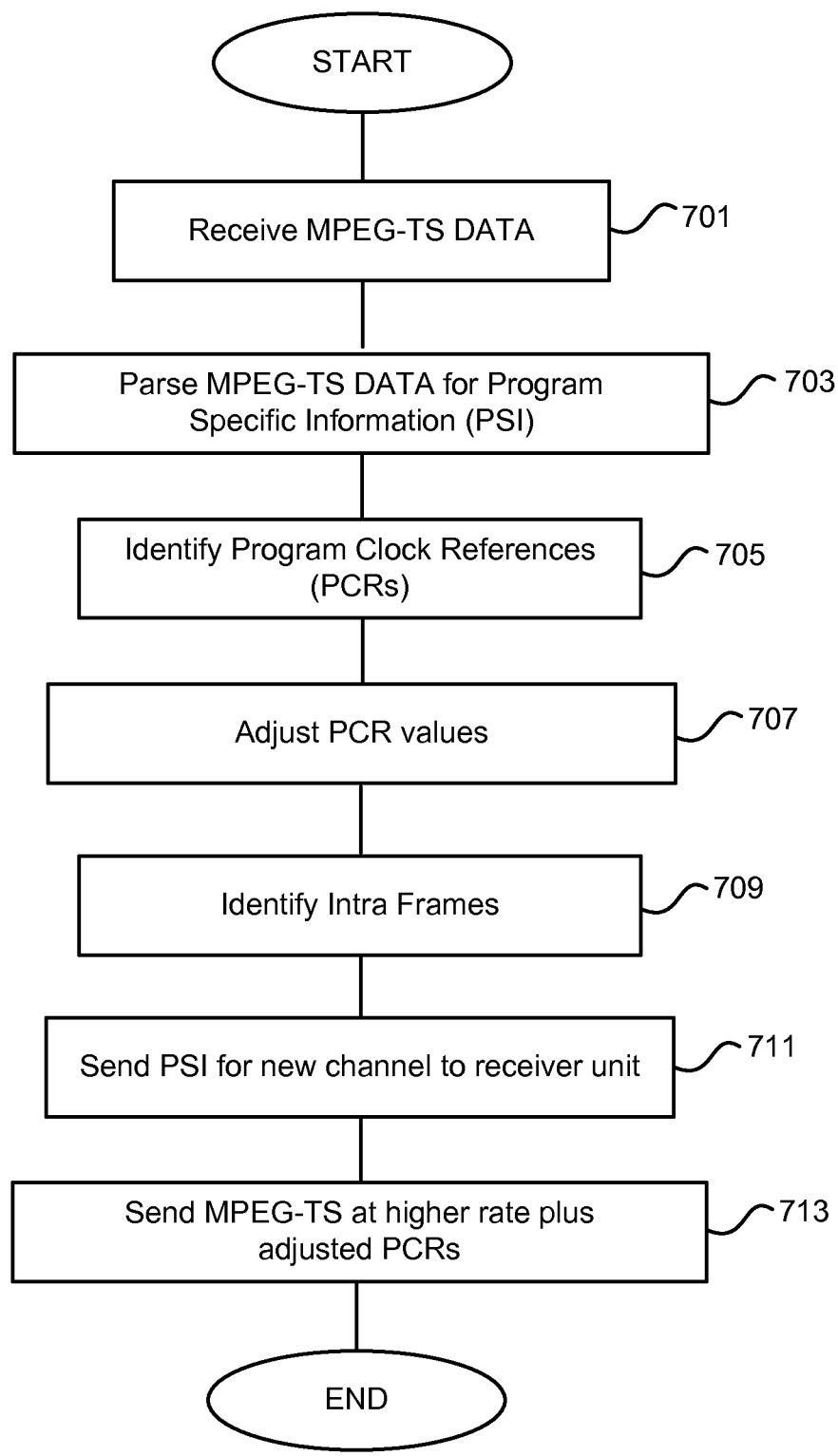
FIG. 5 shows the steps performed by an embodiment of the present invention.

FIG. 5 shows the steps performed by a channel change unit 605 according to the embodiment of FIG. 4, and in particular further details about how the channel change unit 605 is configured to align the Program Specific Information with the Intra Frames. In step 701 a MPEG transport stream is received. The MPEG transport stream will have a first bit rate, which will be determined by the sender of the MPEG transport stream, for example a MPEG-TS multiplexer provided in a IPTV network.

In step 703 the channel change unit 605 is configured to parse the incoming MPEG transport stream for Program Specific Information. This is preferably done during an initial start-up phase, so that the Program Specific Information is available to enable the Program Clock References to be identified. The parsed Program Specific Information is stored in the cache 607. Preferably, since some Program Specific Information may change over time, the channel change unit 605 is adapted to store the latest Program Specific Information tables.

Next, in step 705 the Program Clock References are identified within the received MPEG-TS. One or more of the Program Clock References are then adjusted, step 707, for example by increasing one or more of the Program Clock Reference values in accordance with the amount by which the bit rate of the MPEG transport stream is going to be increased during a channel change procedure, i.e. in order to reduce the buffering time during such a channel change procedure.

The channel change unit 605 must also identify or track the video Intra Frames (i.e. Random Access Points), step 709. As soon as a channel change or tune-in command is received (e.g. IGMP Join), the channel change unit 605 then sends all the Program Specific Information from the cache 607 for the requested IPTV channel (IP Multicast Group) in step 711, before it starts sending the actual MPEG-TS data for the new IPTV channel at the higher bit rate, and with the increased Program Clock References, step 713.

Therefore, in addition to reducing the delay "Z" shown in FIG. 1, the embodiment of FIGS. 4 and 5 also reduces the delay "X" shown in FIG. 1.

Figure 6:
FIG. 6 shows a channel change unit according to another embodiment of the present invention.

FIG. 6 shows an embodiment according to another aspect of the invention, which is aimed at reducing the delay "Y" shown in FIG. 1. This embodiment relates to sender controlled PSI alignment. As shown in FIGS. 3 and 4, a receiver unit 801, for example a set top box, receives video data from a sender unit 803, for example a MPEG-TS multiplexer. In this embodiment the sender unit 803 is configured to independently align the Program Specific Information with the video random access points into the stream (Intra Frames), thereby increasing the probability of a faster start-up of the stream during a channel change procedure.

Further information will now be given concerning how the Program Clock Reference values may be adjusted according to the embodiments described above. The Program Clock Reference values are used to synchronize the system clock of a receiver unit (501, 601, 801) with the system clock of a sender unit (503, 603, 803). The Program Clock Reference values are given in units of 1/27000000 seconds (27 MHz). The difference between two Program Clock References values $PCR_1$, $PCR_2$ can be calculated as "time in seconds the system clock progresses", i.e.:

$$(PCR_2-PCR_1)/27000000$$

Thus, the following equation shows the intended bit rate of the MPEG transport stream in terms of the Program Clock Reference and the number of transport stream packets between the two PCR packets ("dNoTS"). The bit rate is assumed to change at PCR boundaries. The bit rate is calculated by the bits between two PCR packets divided by the system clock progress during that time:

$$dNoTS*188*8*27000000/(PCR_2-PCR_1)=\text{Transport Stream bit rate in bits/s}$$

Therefore, in order to increase the bit rate of the MPEG transport stream, either the number of packets in the transport stream between the two PCR values must be increased or the difference between two PCR values ($PCR_2-PCR_1$) decreased.

The embodiments described above are based on the realization that the Program Clock Reference values in the initial MPEG transport stream are modified (i.e. the difference ($PCR_2-PCR_1$) is decreased), rather than the number of packets in the transport stream between two packets with Program Clock References being modified.

Figure 7:
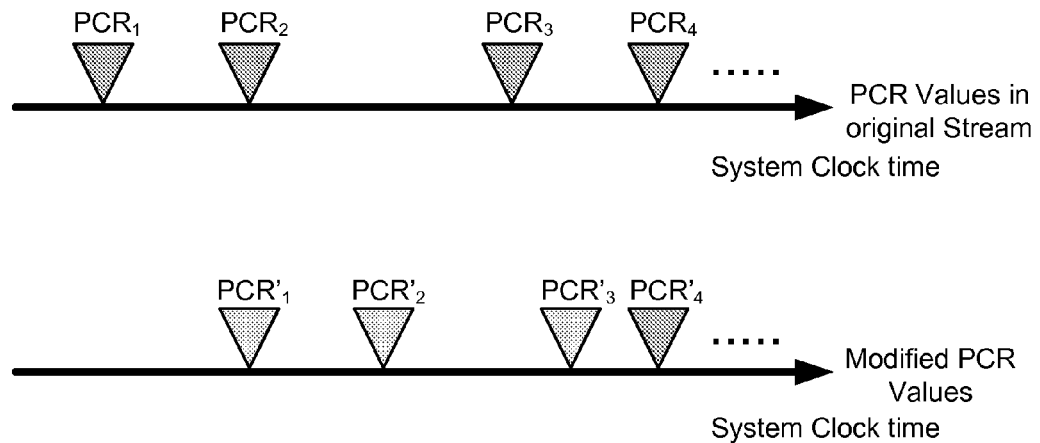
FIG. 7 illustrates how Program Clock References may be adjusted according to embodiments of the present invention.

FIG. 7 depicts how the Program Clock Reference values may be adjusted. The references $PCR_1$, $PCR_2$, etc represent the values of the system clock, and correspond to the Program Clock Reference values received in the original MPEG transport stream, i.e. from the sender units 503, 603 in FIGS. 3 and 4, respectively. According to the invention, one or more of these Program Clock Reference values are adjusted as shown in the lower part of FIG. 7. The actual number of PCR values to be adjusted depends on the buffering time (i.e. DTS (i)–PCR (i)) of the first found intra frame. This initial buffering time can be "shortened", thus all PCR timestamps until the decoding time of the first intra frame must be modified. For example, the first three Program Clock Reference values $PCR_1$, $PCR_2$ and $PCR_3$ may be adjusted by increasing their values to $PCR'_1$, $PCR'_2$ and $PCR'_3$, respectively, in accordance with how much the bit rate is to be increased. It will be appreciated that fewer, or more, PCR values may be adjusted. The number of PCR values to be adjusted depends on a number of factors, including (1) the PCR rate in the TS packets (i.e. what is the fraction of TS packets carrying PCR values?), (2) the bit rate increase factor given as the fraction between the outgoing bit rate and the incoming bit rate, (3) the duration during which the channel change unit transmits with a higher bit rate If, for example, it is assumed that the channel change units 505, 605 of FIGS. 3 and 4 receive a MPEG transport stream at a first bit rate, and that the MPEG transport stream is to be transmitted from the channel change units 505, 605 at a second bit rate that is 30% higher than the first bit rate, i.e. to provide a faster buffer fill in the set top boxes 501, 601, then the differences between "$PCR_2$ and $PCR_1$", "$PCR_3$ and $PCR_2$" and $PCR_4$ and $PCR_3$" should be decreased by 23% (i.e. p/(1+p), where "p" is the percentage by which the second bit rate is higher than the first, 30%=0.3 in this example, giving 0.3/1.3=23%). Here, it is assumed that the initial buffering time of the first intra frame (which is $DTS_1-PCR_1$) is equal to ($PCR_4-PCR_1$).

In the example above the PCR values from $PCR_4$ onwards are not changed, or at least only shifted with the same fixed amount together with the DTS/PTS, (i.e. because MPEG transport streams from $PCR_4$ onwards are intended to be sent at the "intended" bit rate because the buffers are sufficiently filled).

There are a number of ways in which the PCR values may be modified. The invention is intended to embrace all such ways, some of which are described below.

According to one embodiment it is assumed that at least one predetermined PCR is known, for example $PCR_4$, such that all previous values are modified, and that all subsequent PCR values remain unmodified. For this to be possible, the transport stream must be buffered in a network buffer up to the predetermined PCR value, i.e. $PCR_4$ in this example, before $PCR_1$ can be modified and sent. The transport stream may be buffered in the channel change units 505, 605, or elsewhere in the network. Then, because the transport stream has been buffered up to $PCR_4$, this allows $PCR_2$ and $PCR_3$ to be modified too.

For a 30% increase in bit rate, the new values $PCR'1$, $PCR'2$, $PCR'3$ are calculated as:

$$(PCR_4-PCR_3)*0.77=(PCR_4-PCR'_3), \text{thus}$$

$$PCR'_3=PCR_4-(PCR_4-PCR_3)*0.77$$

$$(PCR_3-PCR_2)*0.77=(PCR'_3-PCR'_2), \text{thus}$$

$$PCR'_2=PCR'_3-(PCR_3-PCR_2)*0.77$$

And finally, $$(PCR_2-PCR_1)*0.77=(PCR'_2-PCR'_1), \text{thus}$$

$$PCR'_1=PCR'_2-(PCR_2-PCR_1)*0.77$$

According to another embodiment, another method of adjusting the PCR values is to increase the value for $PCR_1$ to a "good" value $PCR'1$. For example, the frames can be buffered for around 500 ms. Improved start-up should lead to a reduced buffering of around 250 ms. This means, that the PCR value should be increased by a dPCR of 6750000 (27 MHz units) or 22500 (90 kHz units). The value for $PCR'2$ is chosen so that either the MPEG transport stream bit rate is increased by the desired percentage or that the dPCR is decreased linearly over a number of PCR values to zero.

According to another embodiment, a number of PCR values are modified, for example PCR1, PCR2, PCR3 to increase the bit rate, with all remaining PCR values PCR4, PCR5, etc allowed to be shifted together with all remaining DTS/PTS. A drawback of this technique, however, is that bit stream manipulation is required not only during the initial phase (i.e. during channel change), but also needs to be done all the time.

It will be appreciated that the various embodiments of the invention described above have the advantage of enabling a channel change procedure to be optimized.

In the embodiments described above it is preferable that, to provide further optimization, the set top box receives the PAT and PMT tables immediately before the Intra Frames. This has the advantage of decreases the probability that the set top box tunes in immediately after a PAT (worse case) but before a PMT (the set top box cannot find the PMT without the PAT). The PAT and PMT tables assist with finding the Intra Frames in the transport stream. This is preferable since a receiver, such as a set top box, should receive all necessary PSI information (in particular PAT, PMT, but also CA information) before the first Intra Frame (Random Access Point into the video stream). Otherwise, the receiver cannot find the correct flows in the MPEG-TS stream.

According to another embodiment, it is noted that the intermediate node (505, 605) may be adapted to improve a channel change by sending first the PSI information from the PSI cache (607) and then sending the first intra frame from the buffer (506, 606) without any PCR modification.

The embodiments described above rely on Program Clock References being adjusted. There are numerous ways in which the Program Clock References may be conveyed in the MPEG transport stream, and hence how they may be adjusted.

According to one technique, the MPEG transport stream may be configured in such a way that only Intra Frame transport stream packets carry PCR information. Thus, if the channel change unit is configured to provide the MPEG transport stream "at a higher initial data rate", the PCR value in the MPEG TS header is modified. With this technique the step of adjusting the PCR values involves the further step of identifying transport stream packets having PCR fields.

According to an alternative technique, the MPEG transport stream may be configured such that a "dummy" stream is provided for the PCR values. In other words, the MPEG transport stream is constructed in such a way, that the PCR is provided as a separate TS stream. As mentioned above the PMT defines the PID of the PCR stream. The network can therefore easily identify the flow and rewrite the identified TS packets (without any dependency on the other packets).

According to an alternative technique, the Electronic Services Guide data, or any other suitable side channel, may be extended to include special channel changing information. For example, the channel change information provided in the Electronic Services Guide may include a factor by which the MPEG transport stream bit rate is increased. The receiver, such as a set top box, must adjust the decoding times accordingly and decreases the buffering time by the given factor. Thus, according to such an arrangement, the set top box ignores the Program Clock References since it knows that the transport stream is provided at a higher bit rate. Such an embodiment has a disadvantage, however, in that it relies on the set top box being adapted, which means that it cannot be used in existing equipment.

In the embodiments described above the channel change units 505, 605 are described as residing somewhere between a receiver unit, such as a set top box, and a sender unit, such as a MPEG-TS multiplexer. It is noted, however, that a channel change unit may also form part of the receiver unit or sender unit themselves. For example, it there is sufficient bandwidth to the receiver, such that the receiver can directly receive multiple channels rather than just a "selected" channel, then the function of the channel change unit may be adopted in the receiver unit.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for tuning to a channel of a Moving Pictures Expert Group transport stream (MPEG-TS), the method comprising:
receiving a MPEG transport stream at a first bit rate, the MPEG transport stream comprising a plurality of channels;
identifying program clock reference (PCR) values in the received MPEG transport stream;
selecting a predetermined PCR value in the received MPEG transport stream;
adjusting the PCR values that occur prior to said predetermined program clock reference value;
transmitting the MPEG transport stream, including the adjusted PCR values, at a second bit rate; wherein the second bit rate is higher than the first bit rate;
wherein adjusting comprises adjusting the respective PCR values in relation to the difference between the second bit rate and the first bit rate.

2. A method of claim 1 wherein the adjusting comprises adjusting a difference between a first PCR value and a second PCR value.

3. A method of claim 2 wherein the adjusting further comprises adjusting a difference between the second PCR value and a third PCR value.

4. A method of claim 1 further comprising buffering the received MPEG transport stream.

5. A method of claim 4 further comprising wherein buffering the received MPEG transport stream comprises buffering the received MPEG transport stream up until the predetermined PCR value.

6. A method of claim 1:
further comprising aligning program specific information (PSI) with intra frames in the received MPEG transport stream;
wherein the transmitting the MPEG stream comprises the transmitting an aligned MPEG transport stream.

7. A method of claim 1 wherein the transmitting the MPEG transport stream comprises transmitting program specific information (PSI) prior to transmitting intra frame packets.

8. A method of claim 1 wherein transmitting the MPEG transport stream comprises transmitting the MPEG transport stream at the second bit rate for a predetermined period of time.

9. A method of claim 8 wherein the predetermined period of time corresponds to a time period required to buffer data for a tuning procedure.

10. A method of claim 1 wherein the PCR values are provided in intra frame packets of the MPEG transport stream.

11. A method of claim 1 wherein the PCR values are provided in a dedicated channel in the MPEG transport stream.

12. A method of claim 1 further comprising tuning to a channel of a MPEG transport stream by performing at least one of tuning from an existing channel to a new channel or tuning to an initial channel.

13. A method of claim 1 wherein the method is used to tune to a channel of an Internet Protocol Television (IPTV) network.

14. A node for tuning to a channel of a Moving Pictures Expert Group transport stream (MPEG-TS), the node comprising:
a receiver unit for receiving a MPEG transport stream at a first bit rate, the MPEG transport stream comprising a plurality of channels;
a processing unit configured to:
identify program clock reference (PCR) values in the received MPEG transport stream;
select a predetermined PCR value in the received MPEG transport stream;
adjust the PCR values that occur prior to said predetermined PCR value;

a transmitter unit configured to transmit the MPEG transport stream, including the adjusted PCR values, at a second bit rate; wherein the second bit rate is higher than the first bit rate;

wherein the processing unit is configured to adjust the respective PCR values in relation to the difference between the second bit rate and the first bit rate.

15. A node of claim 14 wherein the processing unit is configured to adjust a difference between the second PCR value and a third PCR value.

16. A node of claim 14 further comprising a buffer for storing the received MPEG transport stream.

17. A node of claim 14 wherein the transmitter unit is configured to transmit the MPEG transport stream at the second bit rate for a predetermined period of time.

18. A node of claim 14:

further comprising a cache for storing program specific information (PSI);

wherein the transmitter unit is configured to transmit the program specific information (PSI) from the cache prior to transmitting intra frame packets of the MPEG transport stream.

19. The node of claim 14 wherein the node forms a portion of an Internet Protocol Television (IPTV) network.

* * * * *